United States Patent
Christmas et al.

(10) Patent No.: US 6,275,915 B1
(45) Date of Patent: Aug. 14, 2001

(54) SELECTIVE MEMORY DUPLICATION ARRANGEMENT

(75) Inventors: Walter Patrick Christmas, Boulder; Billy G. Fuller, Jr., Westminster; Donald G. Koch; John Michael Nichols, both of Broomfield, all of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/289,240

(22) Filed: Apr. 9, 1999

(51) Int. Cl.$^7$ ..................................................... G06F 11/20
(52) U.S. Cl. .............................. 711/162; 711/161; 714/1; 714/2; 714/5; 714/6; 714/13
(58) Field of Search .................................... 711/161, 162, 711/163; 714/1, 2, 5, 6, 10–13; 709/200, 205, 212, 216

(56) References Cited

U.S. PATENT DOCUMENTS

| | | | |
|---|---|---|---|
| 4,805,106 | 2/1989 | Pfeifer ................................. | 710/200 |
| 4,823,256 | * 4/1989 | Bishop et al. ........................ | 714/10 |
| 4,975,838 | 12/1990 | Mizuno et al. ...................... | 709/221 |
| 5,128,943 | * 7/1992 | Tulpule et al. ...................... | 714/22 |
| 5,148,433 | 9/1992 | Johnson et al. ...................... | 714/10 |
| 5,210,866 | * 5/1993 | Milligan et al. .......................| 714/6 |
| 5,644,696 | * 7/1997 | Pearson et al. ........................| 714/6 |
| 5,668,726 | * 9/1997 | Kondo et al. ........................ | 701/115 |

OTHER PUBLICATIONS

Curtis Nelson, Crystal Group (Hiawatha, IA—319–378–1636), *Redundancy–Evaluating Your Needs*, Computer Telephony, Sep. 1996, vol. 4, Issue 9, pp. 101–102.

* cited by examiner

Primary Examiner—Than Nguyen
(74) Attorney, Agent, or Firm—David Volejnicek

(57) ABSTRACT

An active-standby dual processor (100) performs only selective memory duplication and does so via hardware (114, 117, 118) and the operating system (109). A page table (217) stores a shadowing flag (203) for each memory page of the active memory (116) of the processor (101) that indicates whether or not the corresponding page is shadowed. When the operating system allocates (302, 402) memory to a process—either statically at creation of the process or dynamically during execution of the process—it checks (304, 404) whether the process program's data statement indicates shadowing or whether the MALLOC request includes a segment selector that indicates shadowing; if so, it sets (306, 406) the allocated page's shadowing flag. When the active processor performs (600, 602) a write of its memory, a page table controller (117) checks (500–508) if the written page's shadowing flag is set. If so, an interprocessor interface (118) is caused (510, 604–606) to replicate the write on the standby processor's memory; if not, the write is not replicated.

19 Claims, 4 Drawing Sheets

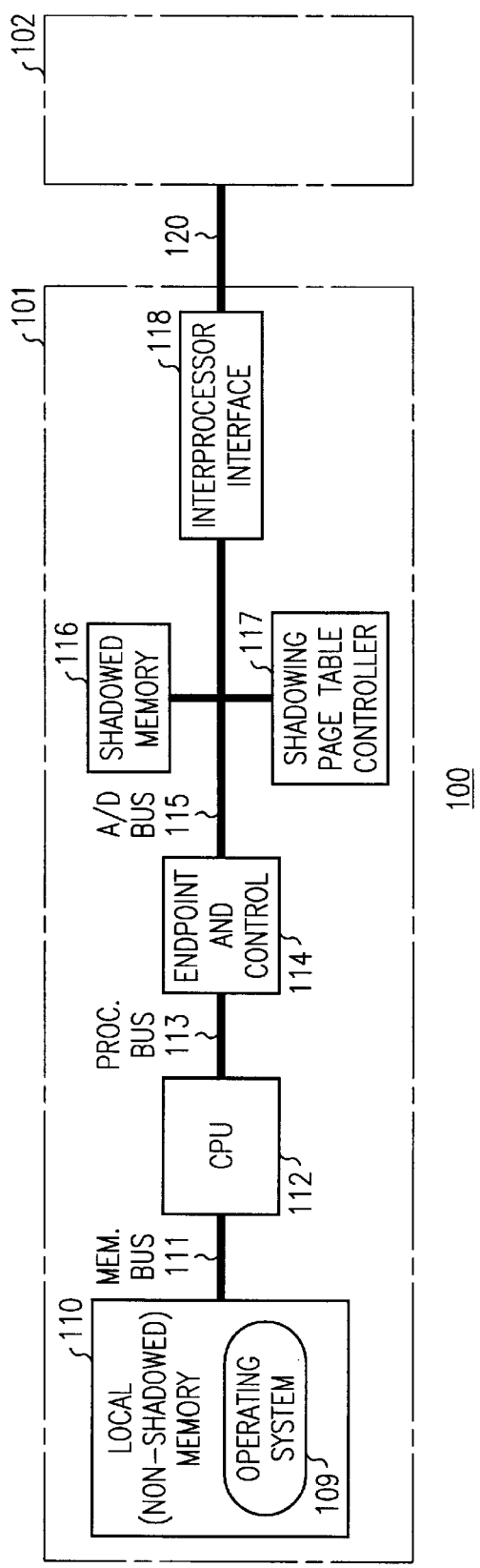

SELECTIVE MEMORY DUPLICATION ARRANGEMENT

TECHNICAL FIELD

This invention relates to replicated high-reliability processing systems in general, and to duplicated-memory systems in particular.

BACKGROUND OF THE INVENTION

High-reliability processing systems often require duplication of the processor (including processor memory), so that it is not a single-point-of-failure in the system. Usually, one processor is active and runs the system, and the other processor is kept in "standby" mode, where it is continually updated with copies of memory-write transactions occurring in the active processor (this updating process is called "shadowing"). If the active processor has a fault, then the system switches to the standby processor and continues the system's processing tasks virtually glitchlessly, since it has knowledge of the state of the active processor at the time of the failure.

A commonly-used shadowing method copies all data from the active processor to the standby processor's memory, even though only a portion of it is actually needed in order for the standby processor to continue operating the system in case of an active processor fault. This method of shadowing has become a serious bottleneck for high-performance processing systems. It reduces overall system performance, as it usually takes longer to transfer data from the active processor to the standby processor than it takes to perform a normal memory-write operation on the active processor.

Another known method of shadowing is called "transaction-based duplication" or "software duplication". The basic idea is that the active processor sends information about what functions it is performing to the standby processor, and the standby processor duplicates these functions and in the process updates its memory state to that of the active processor. While it has very little hardware impact, other than the need for a transaction channel from the active to the standby processor, the complexity of this method lies in the software. The reason for the complexity is that all of the applications code must be able to perform, and must actively manage, the duplication function.

What the art lacks is a shadowing method that would allow either for not shadowing some portions of memory, and/or for dynamic control of which portions of memory are shadowed and which are not.

SUMMARY OF THE INVENTION

This invention is directed to solving the problems and meeting the needs of the prior art. According to the invention, a memory that comprises a plurality of memory areas (e.g., locations, or blocks such as pages) has associated therewith an indication of which ones of the memory areas are shadowed. The indication is illustratively an information store for storing information that indicates which ones of the memory areas are shadowed. In response to a memory area being written (e.g., by an active processor that is associated with the memory), the indication is used to determine whether the written memory area is shadowed. Illustratively, the determination is made by a controller of the information store. If it is determined that the written memory area is shadowed, the writing is replicated on another memory (e.g., the memory of another processor, such as a standby processor). But if it is determined that the written memory area is not shadowed, the writing is not replicated on the other memory. Illustratively, the two memories are interconnected by an interface, and the replication is effected by the interface under command of the active processor.

The invention yields a new method of transferring processor data from an active processor to a standby processor in a duplicated-processor environment, that allows for control over what data is transferred and what data is not. This allows for a reduction in the overall number of system writes that need to be transferred to the standby processor, and hence leads to a direct performance enhancement on the active processor by allowing dynamic changes to be made to the indication of what areas of memory are shadowed. It allows for dynamic control of shadowing. Dynamic control of shadowing in turn allows the system to support such features as "soft" switches, for example. Soft switches occur when the active and standby processors have identical memory images, and the standby processor begins executing instructions immediately after the active processor releases control to the newly-active (previously-standby) processor. This allows for a seamless transfer of system control from one processor to another.

Further according to the invention, when an area of the memory is allocated (e.g., by the active processor's operating system) to an entity (e.g., a program), a determination is made whether memory areas allocated to the entity are shadowed. This is illustratively accomplished by determining whether a data statement of the program entity indicates shadowing, or by determining whether a dynamic memory allocation request of the program entity includes a segment selector that indicates shadowing. In response to a determination that the memory areas allocated to the entity are shadowed, the indication is caused to indicate that the allocated memory area is shadowed. Both the determination and the response thereto are preferably effected by the operating system.

This invention yields another advantage of shielding all software except the operating system (which allocates memory and decides which blocks are shadowed and which are not shadowed) and maintenance code from knowledge of how to effect shadowing. It thus reduces the real-time requirements on the active processor, which would otherwise have to generate transaction-based duplication messages for all functions that require duplication. Moreover, it "hides" shadowing decisions from applications developers, because only the operating system needs to keep track of which areas of memory are shadowed and which are not. This improves time-to-market by reducing system code development, since the applications code need not be written to be able to perform, and to correctly handle, duplication transactions. Furthermore, handling of shadowing decisions in the operating system and in hardware also has real-time savings, since no applications code needs to be executed to generate and handle transaction-based data-duplication messages.

The invention encompasses both a method which comprises the steps of the procedure characterized above, and an apparatus that effects the method steps. The apparatus preferably includes an effector—any entity that effects the corresponding step, unlike a means—for each step. Furthermore, the invention encompasses a computer-readable medium containing instructions which, when executed in a computer, cause the computer to perform the method steps.

These and other features and advantages of the invention will become more apparent from the detailed description of an illustrative embodiment of the invention considered together with the drawing.

BRIEF DESCRIPTION OF THE DRAWING

FIG. 1 is a block diagram of a processing system that includes an illustrative embodiment of the invention;

FIG. 2 is a block diagram of a shadowing page table of a shadowing-page-table controller of the system of FIG. 1;

DETAILED DESCRIPTION

Figure 3:
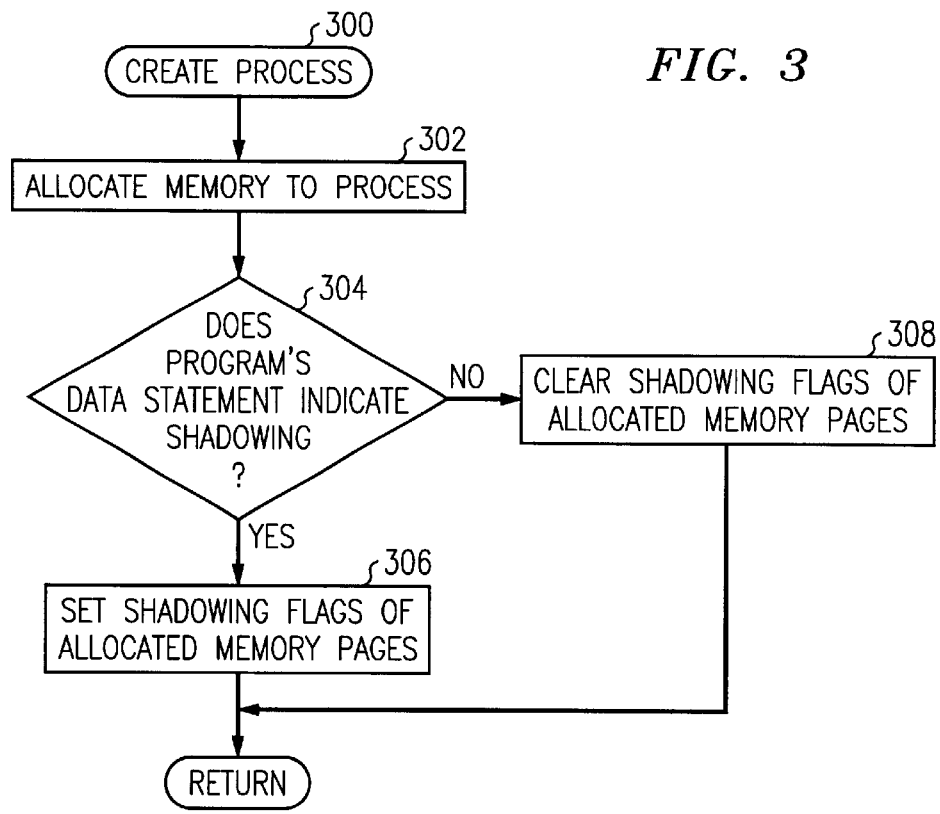
FIG. 3 is a functional flow diagram of a process-creation function of an operating system of a processor of the system of FIG. 1.

FIG. 1 shows a duplicated-processor processing system 100 that comprises a first processor 101 and a second processor 102 connected by an inter-processor link 120. System 100 normally operates in active-standby configuration, where one processor (e.g., first processor 101) is active and performing the system's processing tasks and the other processor (e.g., second processor 102) is inactive, standing by to become the active processor should the presently-active processor fail. Processors 101 and 102 are identical; therefore, only processor 101 is shown in more detail.

Processor 101 comprises a conventional central processing unit (CPU) 112, such as a Pentium microprocessor, connected to a conventional local memory 110 by a conventional memory bus 111. Local memory 110 contains information that need not be shadowed, such as an operating system 109, applications programs, and stack space for use by CPU 112. Processor 101 is also connected to an endpoint-and-control 114 by a processor bus 113. Illustratively, processor bus 113 is a conventional Peripheral Component Interconnect (PCI) bus, and endpoint-and-control 114 is a PCI endpoint enhanced with control capability to support shadowing. Endpoint-and-control 114 is connected by a conventional address-and-data (A/D) bus 115 to a shadowed memory 116, an inter-processor interface 118, and a shadowing page-table controller 117. Shadowed memory 116 stores application-related data, which is read and written by CPU 112 via endpoint-and-control 114. Inter-processor interface 118 interfaces processor 101, and particularly A/D bus 115, to inter-processor link 120. And shadowing page-table controller 117 contains information on which portions of shadowed memory 116 need or need not be shadowed.

Controller 117 includes a shadowing page-table 217 which is shown in more detail in FIG. 2. Shadowed memory 116 conventionally comprises a plurality of pages of memory, and table 217 contains a plurality of entries 200, one for each memory page, that contains a page identifier (ID) 201, optionally various attributes 202 of that page, and a shadowing flag 203 that indicates whether or not that page is to be shadowed.

Shadowing page-table 217 is administered by operating system 109 at process initialization. This is shown in FIG. 3. Programmers of each application program for system 100 decide if they do or do not want the data generated by this program to be shadowed. The programmers then make a corresponding declaration in that program's data statement via the conventional "loader directives" functionality. This declaration informs operating system 109 of whether or not to shadow this program's data. When operating system 109 initializes processor 101 for execution of this program (i.e., creates a corresponding process), at step 300, it assigns pages of memory space in shadowed memory 116 to this program, in the conventional manner, at step 302. The operating system additionally checks the program's data statement to determine if it indicates shadowing, at step 304, and programs table 217 entries 200 corresponding to those pages accordingly. This includes setting or clearing their shadowing flags 203 as dictated by the declaration, at step 306 or 308.

Figure 4:
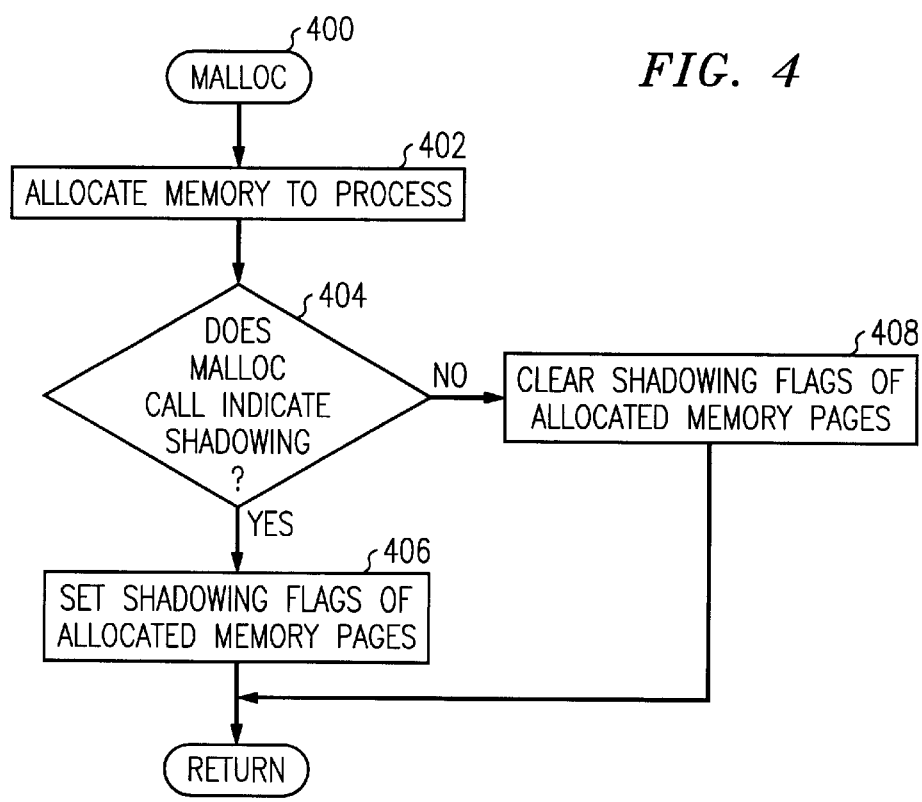
FIG. 4 is a functional flow diagram of a dynamic memory allocation function of the operating system.

System 100 may be a dynamic memory-allocation system—one that can allocate or deallocate memory to or from the application programs as needed during operation. In that case, shadowing page-table 217 is also administered by operating system 109 during process execution. This is shown in FIG. 4. If data generated by this application program is to be shadowed, programmers additionally write the program to issue conventional memory allocation (MALLOC) calls with an additional segment selector—an argument—which indicates to operating system 109 that the dynamically allocated memory is to be shadowed. When operating system 109 receives a MALLOC call, at step 400, and allocates memory space in memory 116 to this program in response thereto, at step 402, it additionally checks whether the MALLOC call includes the segment selector that indicates shadowing, at step 404. If not, it clears shadowing flags 203 of table 117 entries 200 of the allocated memory pages; at step 408 if so, it sets the flags 203 of table 217 entries 200 of the allocated memory pages, at step 406. The operating system then returns from the MALLOC operation.

Figure 5:
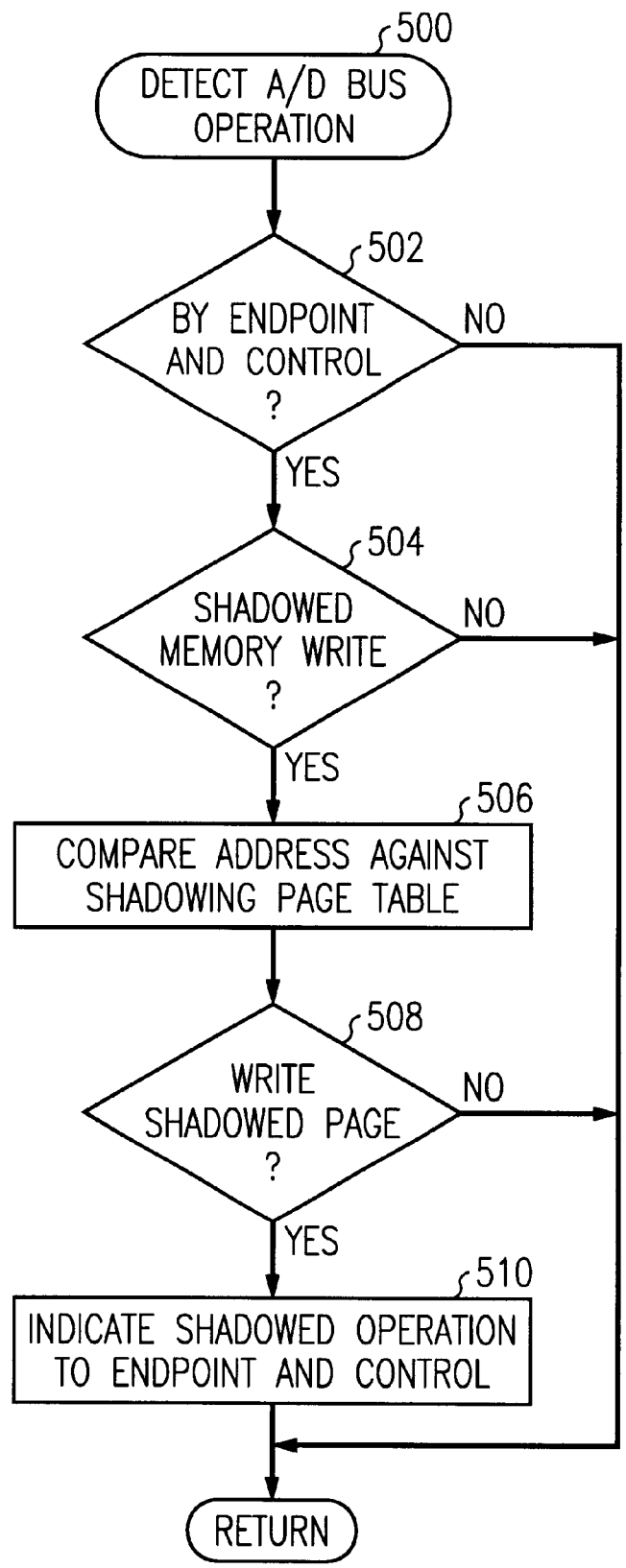
FIG. 5 is a functional flow diagram of operations of the shadowing-page-table controller.
Figure 6:
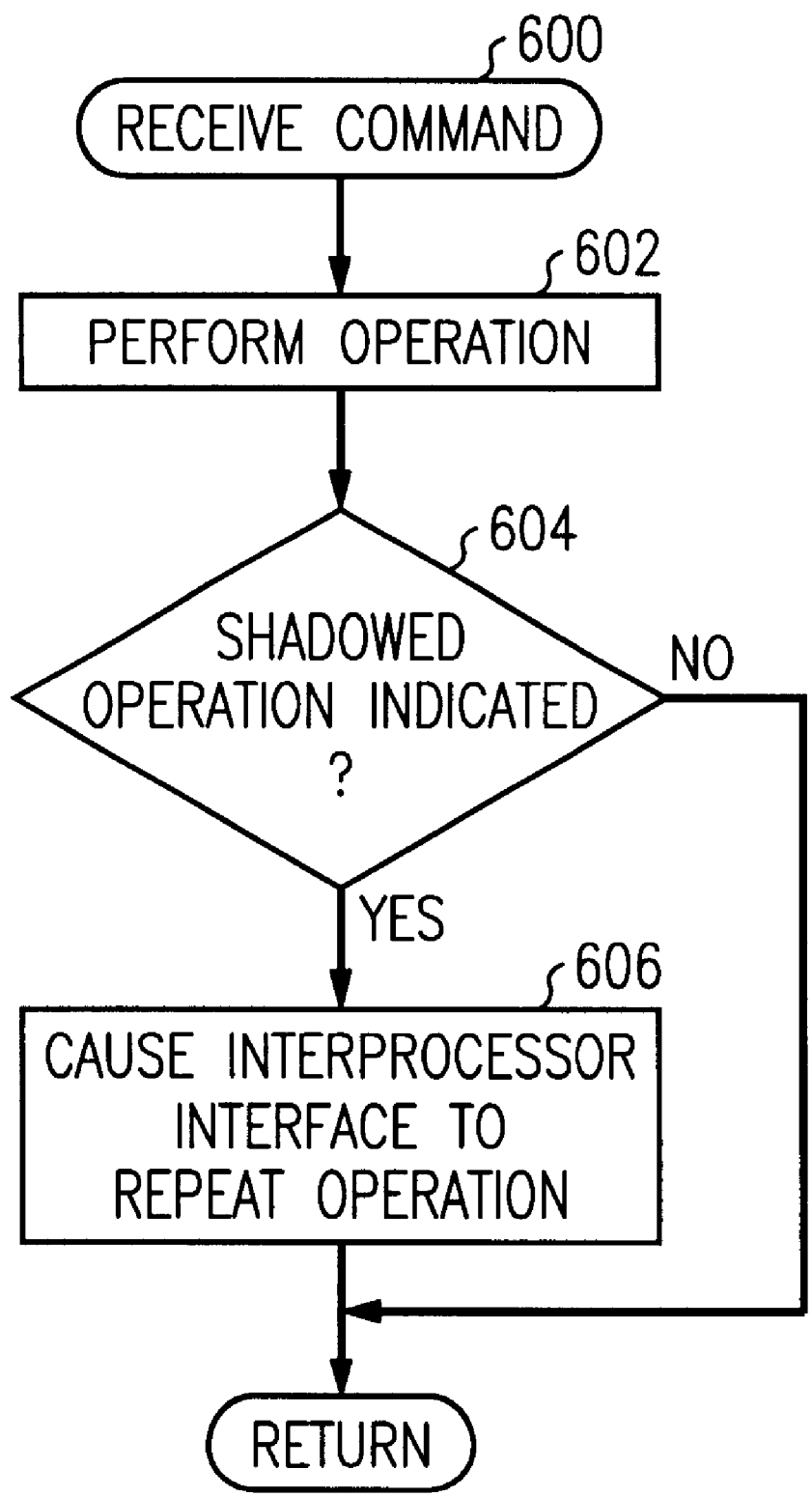
FIG. 6 is a functional flow diagram of operations of an endpoint-and-control of the system of FIG. 1

During system operation, shadowing page-table controller 117 and endpoint-and-control 114 operate as shown in FIGS. 5 and 6, respectively. When CPU 112 writes shadowed memory 116 through endpoint-and-control 114, endpoint-and-control 114 receives the CPU's command, at step 600 of FIG. 6, and performs the commanded operation over A/D bus 115, at step 602. Shadowing page-table controller 117 detects the operation on A/D bus 115, at step 500 of FIG. 5, and monitors it. If it determines, at steps 502 and 504, that it is a write operation on shadowed memory 116 being performed by endpoint-and-control 114, it uses the address of the memory page that is being written to find the corresponding entry 200 in table 117, at step 506, and checks its shadowing flag 203, at step 508. If the shadowing flag 203 is cleared, it does nothing further. If the shadowing flag 203 is set, shadowing page-table controller 117 indicates to endpoint-and-control 114, via a signal link 119, that this write operation is a shadowed operation that must also be performed on processor 102, at step 510. In response, at step 604 of FIG. 6, endpoint-and-control 114 interacts with inter-processor interface 118 to cause it to perform the write operation across inter-processor link 120, at step 606.

On the other side of the link 120, interface 118 of processor 102 receives the operation and then performs it across A/D bus 115 of processor 102 on shadowed memory 1 16 of processor 102. Shadowing page-table controller 117 of processor 102 detects and monitors the operation on A/D bus 115 of processor 102, at step 500 of FIG. 5, recognizes, at steps 502–504, that it is not a write operation performed on shadowed memory 106 of processor 102 by endpoint-and-control 114 of processor 102, and hence ignores it.

Of course, various changes and modifications to the illustrative embodiment described above may be envisioned.

For example, an unmodified operating system could be used, with control of the memory shadowing hardware relegated to custom driver and maintenance programs. In that case, the same loader directives and MALLOC calls can be used to direct the operation of the custom programs. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:

a memory comprising a plurality of memory areas;

means associated with the memory, for indicating which ones of the plurality of memory areas are shadowed;

means responsive to a memory area being written, for determining from the indicating means whether the written memory area is shadowed; and means responsive to a determination that the written memory area is shadowed, for causing the writing to be replicated on another memory, and responsive to a determination that the written memory area is not shadowed, for forbearing replication of the writing on the other memory.

2. The apparatus of claim 1 further comprising:

means for allocating memory areas to entities;

means responsive to allocation of a memory area to an entity, for determining whether memory areas allocated to the entity are shadowed; and means responsive to a determination that the memory areas allocated to the entity are shadowed, for causing the indicating means to indicate that the allocated memory area is shadowed.

3. The apparatus of claim 2 wherein:

the entities comprise programs.

4. The apparatus of claim 3 wherein:

the means for determining whether memory areas allocated to the entity are shadowed comprises means for determining whether a data statement of the program indicates shadowing.

5. The apparatus of claim 3 wherein:

the means for determining whether memory areas allocated to the entity are shadowed comprises means for determining whether a dynamic memory allocation request of the program includes a segment selector that indicates shadowing.

6. An apparatus comprising:

a plurality of memories, at least one of the memories comprising a plurality of memory blocks;

means associated with the one memory, for indicating which ones of the plurality of memory blocks of the one memory are shadowed;

means responsive to a memory block of the one memory being written, for determining from the indicating means whether the written memory block is shadowed; and means responsive to a determination that the written memory block is shadowed, for replicating the writing on others of the plurality of memories, and responsive to a determination that the written memory block is not shadowed, for forbearing from replicating the writing on the other memories.

7. The apparatus of claim 6 further comprising:

a plurality of processors each associated with a different one of the plurality of memories; wherein the determining means are responsive to a memory block of the one memory being written by the processor corresponding to the one memory.

8. The apparatus of claim 7 wherein:

the means for replicating and forbearing comprise at least one interface interconnecting the plurality of memories, and means responsive to the determination that the written memory block is shadowed, for causing the at least one interface to perform the writing on the other memories, and responsive to a determination that the written memory block is not shadowed, for forbearing from causing the at least one interface to perform the writing on the other memories.

9. The apparatus of claim 6 further comprising:

means for allocating memory to programs;

means responsive to allocation of memory in a memory block to a program, for determining from the program whether memory allocated to the program is shadowed; and means responsive to a determination that the memory allocated to the program is shadowed, for causing the indicating means to indicate that the memory block is shadowed.

10. The apparatus of claim 9 wherein:

the means for determining whether memory allocated to the program is shadowed comprises means for determining whether a data statement of the program indicates shadowing.

11. The apparatus of claim 9 wherein:

the means for determining whether memory allocated to the program is shadowed comprises means for determining whether a dynamic memory allocation request of the program includes a segment selector that indicates shadowing.

12. An apparatus comprising:

a memory comprising a plurality of memory areas;

an information store associated with the memory for storing information indicating which ones of the plurality of memory areas are shadowed;

a controller responsive to a memory area being written, for determining from the information store whether the written memory area is shadowed; and a controller responsive to a determination that the written memory area is shadowed, for causing the writing to be replicated on another memory, and responsive to a determination that the written memory area is not shadowed, for forbearing replication of the writing on the other memory.

13. The apparatus of claim 12 further comprising:

the other memory; and an interface between the controller for causing and forbearing and the other memory; wherein the controller for causing and forbearing causes and forebears from causing, respectively, the interface to replicate the writing on the other memory.

14. The apparatus of claim 12 further comprising:

an operating system that allocates memory areas to programs, that responds to allocation of a memory area to a program by determining whether memory areas allocated to the program are shadowed, and that responds to a determination that the memory areas allocated to the program are shadowed by causing the information store to store information indicating that the allocated memory area is shadowed.

15. A method of shadowing memory comprising:

writing a memory area of a first memory comprising a plurality of memory areas;

determining whether the written memory area is shadowed, from stored information indicating which ones of the plurality of memory areas are shadowed;

in response to determining that the written memory area is shadowed, replicating the writing on a second memory; and in response to determining that the written memory area is not shadowed, forbearing from replicating the writing on the second memory.

16. The method of claim 15 further comprising:

allocating a memory area to an entity;

in response to the allocating, determining whether memory areas allocated to the entity are shadowed; and in response to determining that the memory areas allocated to the entity are shadowed, causing the stored information to indicate that the allocated memory area is shadowed.

17. The method of claim 16 wherein:

the entity comprises a program; and determining whether memory areas allocated to the entity are shadowed comprises determining whether a data statement of the program indicates shadowing.

18. The method of claim 16 wherein:

the entity comprises a program; and determining whether memory areas allocated to the entity are shadowed comprises determining whether a dynamic memory allocation request of the program includes a segment selector that indicates shadowing.

19. The method of claim 16 wherein:

a memory area comprises a memory block; and allocating a memory area to an entity comprises allocating memory in a memory block to a program.

* * * * *